No. 849,474. PATENTED APR. 9, 1907.
F. W. HEDGELAND.
DIFFERENTIAL CLUTCH MECHANISM FOR AUTOMOBILES.
APPLICATION FILED SEPT. 17, 1906.

Witnesses:
Wm. Geiger
H. W. Munday

Inventor:
Frederick W. Hedgeland
By Munday, Evarts, Adcock & Clarke.
Attorneys

UNITED STATES PATENT OFFICE.

FREDERICK W. HEDGELAND, OF CHICAGO, ILLINOIS.

DIFFERENTIAL CLUTCH MECHANISM FOR AUTOMOBILES.

No. 849,474.　　　Specification of Letters Patent.　　　Patented April 9, 1907.

Application filed September 17, 1906. Serial No. 334,845.

*To all whom it may concern:*

Be it known that I, FREDERICK W. HEDGELAND, a citizen of the United States, residing in Chicago, in the county of Cook and State of Illinois, have invented a new and useful Improvement in Clutch Mechanism for Automobiles, of which the following is a specification.

This invention relates to the construction of the clutching mechanism employed for transmitting power from the motor to the driving wheels or axles of automobiles. The mechanism of the invention is adapted to transmit like power to both axles or wheels when moving ahead to permit either wheel to overrun when turning corners and to insure engagement of both clutches when both wheels overrun. The construction also permits the employment of the motor in braking or retarding the wheels when moving downhill and possesses great simplicity and strength and is easily applied to existing automobiles.

The nature of the invention is fully set forth below and illustrated in the accompanying drawings, in which—

Figure 1:
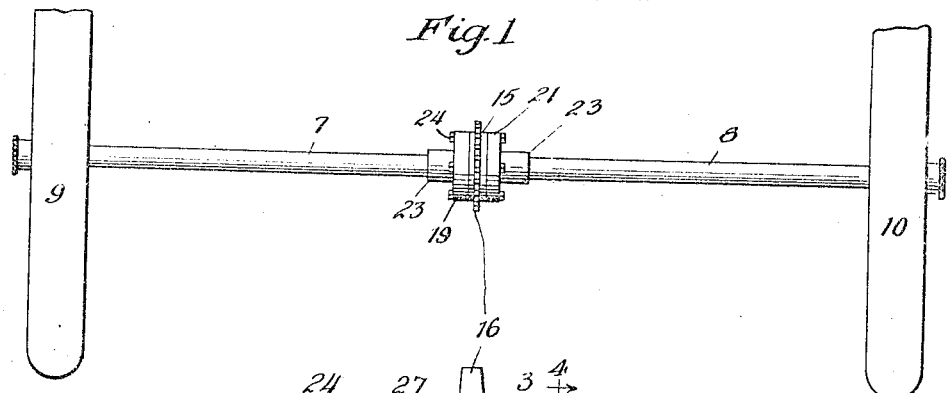
Figure 2:
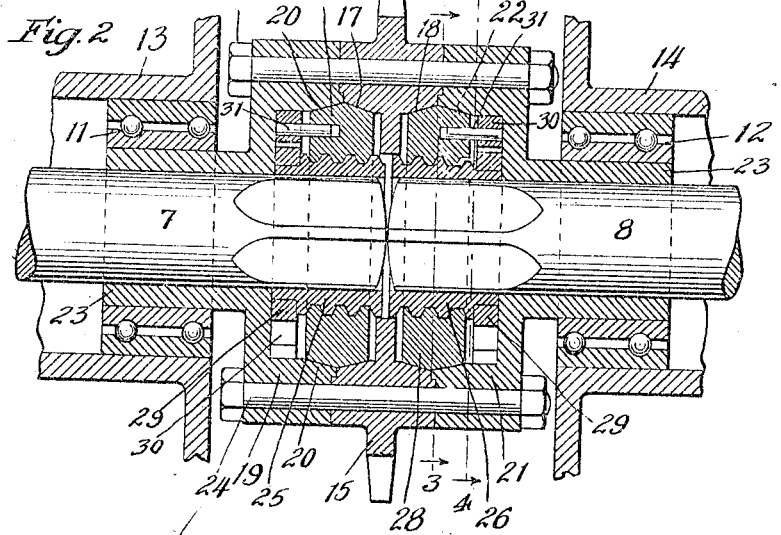
Figure 3:
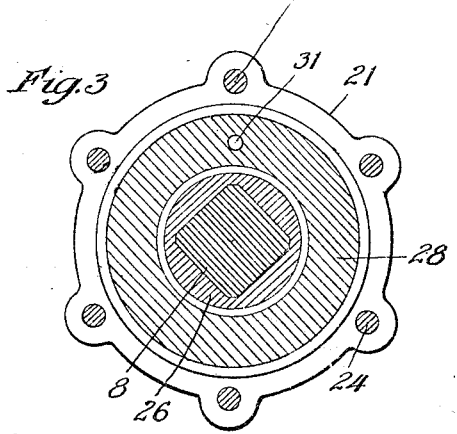
Figure 4:
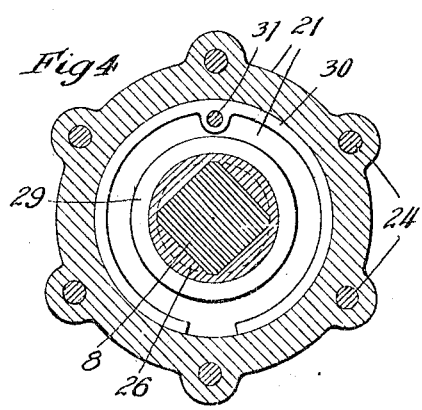

Figure 1 is an elevation of the driving wheels and axles of an automobile to which my invention has been applied. Fig. 2 is an enlarged longitudinal section of the clutch mechanism; and Figs. 3 and 4 are sections on the lines 3 3 and 4 4, respectively, of Fig. 2.

In said drawings, 7 and 8 are the axles of the driving-wheels 9 and 10. The inner ends of the axles to which the clutch mechanism is applied preferably come together, as shown, and are supported in any suitable way—as, for instance, by the bearings 11 and 12 in the stationary parts 13 and 14 of the automobile. The clutch mechanism is double, one part for each axle, and will now be described. A ring 15, having sprocket-teeth 16 formed thereon, adapted to receive power from the motor of the machine, encircles the abutting ends of the two shafts and is provided with two interior inclined friction-surfaces 17 and 18, one for each clutch. At one side of the ring 15 is a cup-shaped member 19, having an interior inclined friction-surface 20, and at the other side of the ring is a similar cup-shaped member 21, having an interior inclined friction-surface 22. The surfaces 17 and 22 incline in one direction and the surfaces 18 and 20 incline in the opposite direction. Both cup-shaped members are provided with sleeves 23, fitting the axles and inclosed by the bearings 11 and 12. The ring and the clutch members 19 and 21 form the non-shifting members of the clutches, and they are also the driving members thereof and are provided with exterior eyes adapted to receive the bolts 24, whereby they are secured together, so that they form substantially a barrel or drum adapted to hold oil and within which the moving parts of the clutch may be located.

The ends of the axles are squared for a short distance, as shown, and upon these square portions threaded screw-sections 25 and 26 are fitted with freedom to slide a slight distance. These screw-sections are threaded in opposite directions and engage threads formed on the interior surfaces of the driven clutch members 27 and 28, the outer surfaces of each of said clutch-driven members being provided with reversely-inclined friction-surfaces, so that one is adapted to oppose the surfaces 17 and 20, and the other is adapted to oppose the surfaces 18 and 22. The clutch-driven members 27 and 28 have a turning fit with both their respective opposing surfaces, so that they are adapted to receive motion from either surface whenever the screw exerts power toward it.

The screw-sections are furnished with thrust-collars 29, rigidly secured and acting to contact with the members 19 and 21, and thus to sustain the end thrust coming on the screw-sections, and also acting to stop the screw-sections from running in too far when either member overruns. In each cup-shaped member is inserted a tension-ring 30, attached to the adjacent shifting or driven member by a pin 31, loosely fitting the member, so that the ring travels around the axis with the clutch member and retards the latter sufficiently to cause shifting action by the corresponding screw-section. The inner ends of the shafts abut, as clearly shown, and their outer ends are provided in the customary manner with means for sustaining thrust, so that they are mutually thrust-sustaining.

As drawn the machine is driving forward, the clutch members 27 and 28 engaging the surfaces 17 and 18, and the shifting screw-sections are forced away from one another, carrying their thrust-collars 29 29 against the inner walls of the parts 19 and 21. In case either shaft overruns the screw-section on the squared portion of that shaft moves inward until the inner shoulder of its thrust-collar comes in contact with the driven clutch member, either 27 or 28, and when in this position neither face of the clutch member is engaged, because neither end of the corresponding overrunning screw-section is in contact either with said clutch member or with the inner wall of the corresponding driving member. In driving backward the driving members are of course reversed in their direction of rotation and the driven members automatically shift from the surfaces 17 and 18 to the surfaces 20 and 22, the screw-sections turning in the direction which brings their proximate ends together and making a balanced thrust, and in so doing effecting the shifting of the driven members. The same thing happens when both shafts overrun, as is the case when the engine is used to retard or brake the car, and whenever one shaft overruns during the backward driving or while the engine is used as a brake the shaft encountering the greater road resistance will shift its screw-section, and thus cause its driven clutch member to disengage. In all cases when the overrunning shaft slows down its driven clutch member will again engage with the corresponding driving member. These changes in the clutches are entirely automatic and require neither power from or care upon the part of the operator and permit the use of the driving power to check the car.

While I have shown the shifting members of the clutches as mounted on movable screw-sections sliding on the shafts, it will be understood that the screw-threads may be formed directly on the shafts or the screw-sections be made rigid therewith if the shafts themselves are made longitudinally movable and are normally spaced apart, as are the screw-sections.

I claim—

1. In differential clutch mechanism, the combination of driven members threaded on longitudinally-movable screw-sections mounted on the axles and adapted to drive in both directions, driving members having inclined friction-surfaces opposed to those of the driven members, and means whereby the screw-sections receive their longitudinal movement.

2. In differential clutch mechanism, the combination with the axles, of driven clutch members threaded on longitudinally-movable screw-sections mounted on the axles and adapted to drive in both directions and also adapted to shift, driving members adapted to act in both directions, and means for causing the shifting of the driven members.

3. In a differential clutch mechanism, the combination with an axle or shaft, of a driven clutch member, a longitudinally-movable screw-section mounted on the axle and engaging the thread of said driven member, a driving member receiving the driving power and acting in both directions, and means for causing the shifting of the driven member.

4. In a differential clutch mechanism, the combination with an axle or shaft, of a driven clutch member surrounding the axle, a screw on the axle serving both to shift and to support said driven member, a driving member actuating the driven member, and means for causing the shifting of the driven member.

5. The combination in a differential friction-clutch mechanism, of driving members and driven members, the former surrounding the latter and adapted to drive them in either direction, said driven members disengaging when they overrun in either direction, and means by which the driven members lock with the driving members when the speed of both exceeds that of the driving members in either direction.

6. In differential clutch mechanism, the combination of the shafts, the driving members, the driven members, the latter mounted on the shafts so as to move longitudinally thereof, and adapted to be actuated in either direction, and means whereby the disengagement and reëngagement of the clutch members is caused whenever the direction of movement is changed or a difference between the speeds of the driving and driven members occurs.

7. In a differential friction-clutch mechanism, the combination of driving and driven members with the shafts, the driven members mounted on the shafts and movable longitudinally thereof, and adapted to be actuated in both directions, and means whereby the shafts control the engagement and disengagement of the clutches.

8. The combination with the driving-shaft, of a differential clutch surrounding the same and having its shifting members actuated longitudinally of the shaft by a sleeve mounted upon and rotating with the shaft, and also having a threaded engagement with the shifting member.

9. An automatic differential clutch, embodying driving members and two threaded shifting driven members, adapted to clutch with the driving members in both directions, each of said driven members releasing automatically when it overruns, and means whereby the driven members may be caused to shift.

10. An automatic differential friction-clutch, embodying driving members and driven members, the driven members receiving power in both directions and each of them adapted to release itself automatically whenever it overruns, and means whereby the driven members may be caused to relock with the driving members both when one overruns and when both overrun simultaneously.

11. The combination in a differential friction-clutch, of a driving member and a driven member, one of said members shifting and engaging the other automatically in either direction, and releasing itself automatically when overrunning, and also acting with the non-shifting member as a brake when the engine is throttled.

12. The combination of the driving members and the driven members engaging automatically and driving in either direction, also releasing automatically when either driven member overruns and automatically reëngaging when both driven members overrun so that the motor may then be utilized as a brake.

13. An automatic clutch embodying driving members and driven members, both having opposing friction-surfaces brought into contact by the shifting of the driven members so as to drive in either direction, each of said driven members releasing automatically whenever it overruns, and both reëngaging when they overrun at the same time, and means for shifting the driven members.

14. An automatic clutch embodying driving members and driven members, both the driving members and the driven members having opposing friction-surfaces brought into contact by the shifting of the driven members so as to drive in either direction, each of said driven members releasing automatically whenever it overruns, and both reengaging when they overrun at the same time, and tension means acting on the shifting members and causing them to shift.

15. An automatic clutch embodying driving members and driven members, the latter being threaded interiorly and engaging with shifting screw-sections mounted upon the shafts, the members having friction-surfaces adapting them to communicate power in both directions and to release either driven member which may overrun, and means whereby the driven members after being released, may be caused to turn upon said threads and shift into engagement with the driving members.

16. The combination with shafts to be driven, of differential clutch mechanism mounted on the shafts and having shifting driven members controlled in shifting by the shafts, said mechanism acting positively in both directions and permitting either or both shafts to overrun in either direction.

17. The combination with the driven shafts, of a differential friction-clutch mechanism mounted thereon and controlled by longitudinal movements received from the shafts, and acting to positively drive the shafts in either direction and to permit the shafts to overrun in either direction and to reëngage when both overrun at the same time.

18. The combination with the driven shafts, of a differential friction-clutch mechanism mounted thereon, and opened and closed by longitudinal movements caused by the shafts, said clutch mechanism acting to positively drive the shafts in both directions, to permit either shaft to overrun, and to permit them to reëngage when both overrun at the same time.

FREDERICK W. HEDGELAND.

Witnesses:
H. M. MUNDAY,
WILLIAM A. GEIGER.